(12) United States Patent
Roring et al.

(10) Patent No.: US 8,096,577 B2
(45) Date of Patent: Jan. 17, 2012

(54) HINGE FOR AN AIR-BAG COVER

(75) Inventors: Albert Roring, Gronau-Epe (DE);
Michael Grimmelt, Gronau-Epe (DE)

(73) Assignee: K.L. Kaschier-und Laminier GmbH (DE)

( * ) Notice: Subject to any disclaimer, the term of this patent is extended or adjusted under 35 U.S.C. 154(b) by 51 days.

(21) Appl. No.: 12/528,494

(22) PCT Filed: Feb. 20, 2008

(86) PCT No.: PCT/EP2008/001313
§ 371 (c)(1),
(2), (4) Date: Aug. 25, 2009

(87) PCT Pub. No.: WO2008/104311
PCT Pub. Date: Sep. 4, 2008

(65) Prior Publication Data
US 2010/0308566 A1    Dec. 9, 2010

(30) Foreign Application Priority Data

Mar. 1, 2007  (DE) .................... 20 2007 003 172 U
Nov. 30, 2007  (DE) .................... 20 2007 016 848 U

(51) Int. Cl.
*B60R 21/16*    (2006.01)

(52) U.S. Cl. .......... 280/728.3; 16/221; 16/222; 16/225; 280/728.1

(58) Field of Classification Search ............... 280/728.3, 280/728.1; 16/221, 222, 225, 250, 260
See application file for complete search history.

(56) References Cited

U.S. PATENT DOCUMENTS

| | | | | |
|---|---|---|---|---|
| 5,125,683 A | * | 6/1992 | Nakajima | 280/731 |
| 5,590,901 A | * | 1/1997 | MacGregor | 280/728.3 |
| 5,775,727 A | * | 7/1998 | Sun et al. | 280/728.3 |
| 2004/0227333 A1 | | 11/2004 | Cesar | 280/730.1 |
| 2006/0043701 A1 | | 3/2006 | Zagrodnicki et al. | 280/728.3 |

FOREIGN PATENT DOCUMENTS

| | | |
|---|---|---|
| DE | 19530346 | 2/1996 |
| DE | 102004010643 | 10/2005 |
| EP | 1731381 | 12/2006 |

* cited by examiner

*Primary Examiner* — Eric Culbreth
(74) *Attorney, Agent, or Firm* — Patricia M. Mathers

(57) ABSTRACT

The invention relates to an airbag cover hinge having a textile hinge that can be connected both to the airbag cover and to a carrier part surrounding the airbag cover, wherein the hinge comprises two different systems absorbing forces, which is to say one textile surface structure as a system that is combined to a second system with further warp threads, wherein the warp threads tear under a tensile load on the airbag cover hinge as a first force absorbing system.

8 Claims, 1 Drawing Sheet

HINGE FOR AN AIR-BAG COVER

CROSS REFERENCE TO RELATED APPLICATIONS

This application is the US national stage of PCT application PCT/EP2008/001313, filed 20 Feb. 2008, published 4 Sep. 2008 as WO2008/104311, and claiming the priority of German patent application 202007003172.6 itself filed 1 Mar. 2007 and German patent application 202007016 848.9 filed 20 Nov. 2007, whose entire disclosures are herewith incorporated by reference.

FIELD OF THE INVENTION

The invention relates to a hinge for an air-bag cover having a textile hinge, by means of which an air-bag cover can be connected to a surrounding support frame.

BACKGROUND OF THE INVENTION is During air-bag deployment the air-bag cover opens in order to let the air bag out and the air-bag cover hinge serves to guide the air-bag cover during deployment.

An air-bag cover hinge made of textile or knitted fabric is known from US 2004/0227333. Depending on the size of the air-bag cover used, various forces are applied to the hinge of the air-bag cover during air-bag deployment. The larger the air-bag cover, or the heavier the air-bag cover, the higher are the forces applied to the hinge, and it is critical that the air-bag cover open easily during air-bag deployment and it is critical that a separation of the air-bag cover from the support frame surrounding it is always excluded in order to not put any persons in the area of the air-bag at risk from airborne parts. It is impossible to rule out that the hinge of an air-bag cover known from the prior art made from textile or knitted fabric will tear under unfavorable conditions.

OBJECT OF THE INVENTION

The object of the invention is therefore to provide a hinge for an air-bag cover such that it will safely prevent a tearing or separating of the hinge for the air-bag cover, that can be manufactured cost-effectively, and that simultaneously enables easy deployment of the air-bag cover.

SUMMARY OF THE INVENTION

The object of the invention is attained by a hinge for an air-bag cover having at least two force-absorbing systems, a two-dimensional textile structure and second warp threads as a force-absorbing system that increases the strength of the structure and that when the hinge is loaded to a certain limit tears when the air-bag cover opens.

In one advantageous embodiment the warp threads are aligned parallel to the expected tension in the hinge of the air-bag cover.

For this purpose the warp threads may have a lower elasticity than the elements of the two-dimensional textile structure.

In an advantageous embodiment the warp threads are distributed evenly across the surface of the two-dimensional textile structure in order to enable a uniformly distributed high absorption of forces of the forces occurring during the deployment of the air-bag cover in the area of the hinge.

The warp threads may also be provided exclusively in the edge regions of the air-bag cover hinge in order to avoid a tearing of the two-dimensional textile structure in case of air-bag deployment, or at least to reduce this to a minimum.

SPECIFIC DESCRIPTION

Figure 1A:
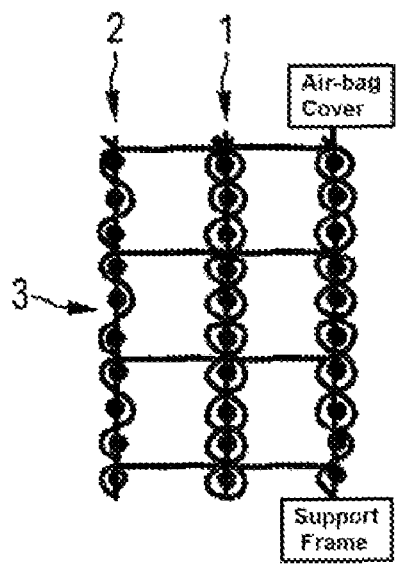
FIGS. 1a and 1b show a simple hinge according to the invention before and after air-bag deployment.
Figure 1B:
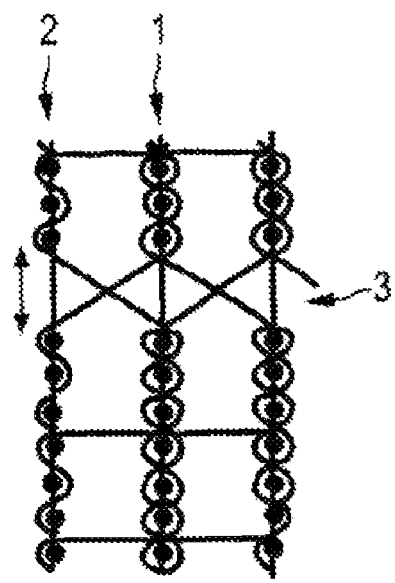
Figure 2A:
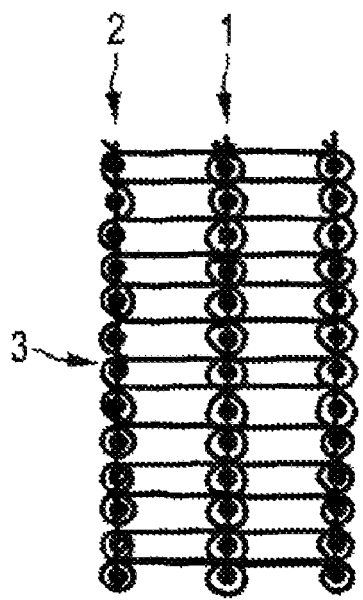
FIGS. 2a and 2b show another hinge according to the invention before and after air-bag deployment.
Figure 2B:
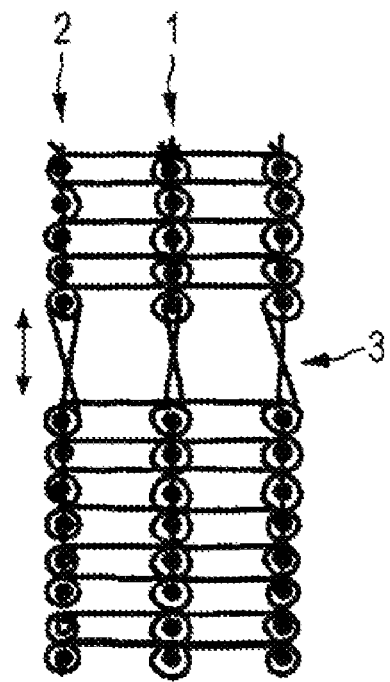

In an advantageous embodiment the two-dimensional textile structure is embodied as shown in FIGS. 1a, 1b, 2a, and 2b as a knitted fabric 2 in order to enable cost-effective production and to enable a good absorption of forces for the forces applied to the hinge during deployment of the air-bag cover via the knitted fabric 2 after the warp threads 1 have torn and separated at 3.

For example, in the knitted fabric 2 one warp thread 1 may be provided in each stitch of the knitted fabric 2, or it is also possible to arrange one or multiple stitches without any warp threads 1 next to a stitch of the knitted fabric 2 that has a warp thread 1.

In an advantageous embodiment the two-dimensional textile structure may be part of a laminated construction together with the warp threads, e.g. a further layer may be laminated onto the two-dimensional textile structure in order to enable, for example, better handling of the two-dimensional textile structure.

Therefore, at least two force-absorbing systems are provided in the air-bag cover hinge, one force-absorbing system being the two-dimensional textile structure, which may be a knitted fabric, for example, and the other force-absorbing system being the warp threads present in the two-dimensional textile structure.

As soon as a deployment of the air-bag cover occurs during air-bag deployment, forces are applied to the air-bag cover hinge that first tear the warp threads, thus taking in or absorbing part of the forces applied. Subsequently, an elastic stretching of the knitted fabric occurs as the secondary force-absorbing system, bringing about a final absorption of the forces applied to the hinge, and the two-step action of two force-absorbing systems safely prevents the air-bag cover from being torn off during deployment. Furthermore, an adjustment can be made as to how far the air-bag cover deploys by means of the quantity and quality of the warp threads used in order to prevent damage, for example, to the windshield of a motor vehicle due to the air-bag cover deploying rapidly. In fact the deployment range and also the deployment speed may be adjusted by the use of a correspondingly large number of warp filaments, or by means of a particular tear resistance thereof such that the air-bag cover deploys in a manner that is sufficiently wide, however, an overturning of the deployed air-bag cover, for example, against the windshield, is excluded.

The invention claimed is:

1. An air-bag cover hinge connected both to an air-bag cover and to a support frame surrounding the air-bag cover, the hinge comprising:
a two-dimensional textile structure forming a secondary force-absorbing system; and
additional warp threads that form a primary-force-absorbing system, that tear when the air-bag cover hinge is subjected to a predetermined tension, and that have a lower elasticity than the elements of the two-dimensional textile structure or of the two-dimensional textile structure itself.

2. The air-bag cover hinge according to claim 1, wherein the additional warp threads are aligned generally parallel to an expected tension in the hinge.

3. The air-bag cover hinge according to claim 1 wherein the warp threads are evenly distributed throughout the two-dimensional textile structure.

4. The air-bag cover hinge according to claim 1 wherein the warp threads are provided exclusively in edge regions of the air-bag cover hinge.

5. The air-bag cover hinge according to claim 1 wherein a knitted fabric is the two-dimensional textile structure.

6. The air-bag cover hinge according to claim 5 wherein a warp thread is provided in each stitch of the knitted fabric.

7. The air-bag cover hinge according to claim 5 wherein the structure has a succession of a stitch of the knitted fabric having a warp thread and one or more stitches having no warp threads.

8. The air-bag cover hinge according to claim 1 wherein the two-dimensional textile structure is part of a laminate.

* * * * *